United States Patent [19]
Haagensen et al.

[11] Patent Number: 6,155,919
[45] Date of Patent: Dec. 5, 2000

[54] AUTOMATED METHOD AND SYSTEM FOR PROCESSING A HOG CARCASS

[75] Inventors: Peter Haagensen; Bruce Johnson, both of Fort Collins, Colo.; John Cliff, Louisville, Ky.

[73] Assignee: Swift & Company, Greeley, Colo.

[21] Appl. No.: 09/196,453

[22] Filed: Nov. 19, 1998

Related U.S. Application Data

[60] Provisional application No. 60/066,142, Nov. 19, 1997.

[51] Int. Cl.⁷ .................................................... A22C 25/18

[52] U.S. Cl. ..................... 452/171; 452/127; 452/136; 452/158

[58] Field of Search ............................... 457/171, 136, 457/127, 158, 170

[56] References Cited

U.S. PATENT DOCUMENTS

| | | | |
|---|---|---|---|
| 3,605,178 | 9/1971 | Hoffmann | 452/171 |
| 5,234,371 | 8/1993 | Andre et al. | 452/171 |
| 5,295,898 | 3/1994 | Andre et al. | 452/171 |
| 5,407,384 | 4/1995 | Boody et al. | 452/171 |

*Primary Examiner*—Willis Little
*Attorney, Agent, or Firm*—Sheridan Ross P.C.

[57] ABSTRACT

An apparatus and method for removing loins from pork bellies to result in a high yield of loin in a two-step method, the first step involving the removal of the loin and the second step involving the skinning of the loin portion removed. A unique knife shaped in the form of a Z is used to cut all the way through the belly. Once complete, the skin from the belly remains on the loin and is subsequently run through a loin skinner in a controlled cutting process that significantly reduces the chance of cutting below the loin fat and into the muscle.

12 Claims, 3 Drawing Sheets

AUTOMATED METHOD AND SYSTEM FOR PROCESSING A HOG CARCASS

RELATED APPLICATION

This application claims priority from U.S. Provisional Patent Application Ser. No. 60/066,142, filed Nov. 19, 1997. The entire disclosure of the provisional application is considered to be part of the disclosure of the accompanying application and is hereby incorporated by reference.

FIELD OF THE INVENTION

The present invention relates to a knife for separating hog loins from a hog belly portion and, in particular, for providing such a knife having a cutting blade contour that reduces the risk of unintentionally cutting into the pork loin.

BACKGROUND OF THE INVENTION

In particular, a pork loin 24 within the loin and belly section 20 typically has a generally circular cross section and typically extends the length L of the loin and belly section 20, as shown by the dashed lines in this figure. Additionally, the loin and belly section includes a belly portion 26 that is considered to extend from the lengthwise end 28 toward the pork loin 24, and more particularly to within approximately ¼ inch of the pork loin 24. Further, the loin and belly section 20 has skin 30 on the lower side.

In many hog processing plants, the loin 24 and the belly portion 26 are required to be separated from one another since the pork loin 24 is substantially more valuable than the belly portion 26. Many times, however, it is difficult to provide an appropriate separation between the pork loin 24 and the belly portion 26 in that the pork loin 24 can vary in contour and shape as it extends through the length L of the loin and belly 20. Thus, it becomes difficult to separate the belly portion 26 from the pork loin 24 leaving, for example, a preferred amount of fat from between ⅜" and ¼" surrounding the pork loin 24.

Typically, as a first step to separating the pork loin from the belly portion 24, a cut 32 is performed for cutting through the ribs therein. Subsequently, a loin pulling knife 36 having a blade 40 with a curvature as shown in FIG. 2 is inserted into the cut 32 and about the loin 24 and subsequently pulled manually by the handles 44 along the length L of the loin and belly portion 20 to thereby separate the pork loin 24 from the belly portion 26. It is not uncommon, however, for even experienced loin pullers (i.e., individuals who manually pull the knife 36 through the length of the loin and belly portion 20) to inadvertently cut into the loin 24. In fact, it is not uncommon for hog processing plants to incur substantial overhead due to pork loins 24 being damaged and/or reduced in size during the loin pulling process. For example, even experienced loin pullers may produce smaller than optimal pork loins 24 that equate to thousands of dollars per loin puller per 8-hour shift. Thus, it would be very advantageous to the hog processing industry to provide a method and apparatus for separating the more valuable pork loin 24 from the belly portion 26 in a manner that reliably provides a more optimal cut between the two. Moreover, it would be beneficial to have a substantially automated machine to assist in removing optimal pork loins, thus eliminating of the more arduous tasks in the pork processing process.

SUMMARY OF THE INVENTION

The present invention is directed to an apparatus and method for improving the profitability of a loin pulling operation. The problems of the prior art relating to waste that occurs in manual loin pulling operations is addressed by providing a knife of a particular configuration, one embodiment of which is shown in the figures, which permits the loin portion to be removed from the adjacent belly portion substantially without cutting into the valuable loin meat. In addition, an objective of the present invention is to leave remaining on the belly portion a greater extent of skin on the loin portion than in conventional U.S. processes, such skin being subsequently removed using a skinning machine after the loin pulling operation. Preferably, the apparatus and method of the present invention results in a pork loin section that has no more than approximately ½" and more preferably about ¼" of fat surrounding the pork loin.

Against conventional thought, the present inventors have determined that by avoiding the trimming of skin from the loin portion of an animal in the same operation as the loin pulling operation to remove the loin from the belly, significant loin yield savings can be achieved. Thus, by separating the loin pulling and skin trimming operations, use of the present method and apparatus achieves desirable reduction of waste occasioned by manual pulling operations whereby excessive loin meat is removed unintentionally.

Although processes in use in Europe typically use a straight blade and sever the loin section from the belly section by use of a straight blade, conventional practice in the United States has been to use a curved U-shaped loin pulling knife so as to gain optimal yield on the belly section of an animal and to simultaneously skin the loin portion. In an attempt to maximize the belly yield and to avoid a subsequent skinning operation, the use of conventional loin pulling knives have sacrificed the unnecessary removal of loin meat, thus significantly reducing the overall profitability of the loin separation operation.

The apparatus of the present invention can be constructed from any suitable material that can attain a sufficient degree of sharpness. Preferably, the blade is made of a spring steel of varying flexibility, with more rigid embodiments preferred for automated systems.

One particular aspect of the present invention relates to an automated system having a control loop that can perceive both the position of the loin pulling knife as well as the position and/or contour of a loin so that a more precise cutting between the loin section and the belly section can be achieved. In practicing the method, the blade of the present invention runs through the cut made in the rib section of the animal carcass, such rib cut providing one vector upon which the blade proceeds throughout the cutting operation. The other extent of the blade, on the opposite side of the animal carcass portion being severed, is configured at a place along the exterior skin side of the carcass to provide for a significant portion of the skin remaining with the belly portion of the carcass. In other words, while the present method and apparatus contemplates the maximization of skin of the animal carcass remaining with the belly portion of the animal carcass after severing between the loin and belly sections, this maximization is achieved without compromising the ability to obtain a complete loin having a desired layer of fat surrounding it after the cutting operation.

Various embodiments of the present invention involve automated movement of the blade between the loin and belly sections of the animal carcass. Note that the blade used in automated processes may be desirably more rigid than in manual operations so as to maximize repeatability of desired cuts. Instead of manual effort extended on two opposing handles on the ends of conventional U-shaped loin pulling knives, the present invention contemplates the use of fixed driving means operatively associated with the ends of a cutting blade to move the blade in a predetermined fashion between a loin and belly section of the carcass.

One aspect of the present invention relates to the skinning of the separated loin portion. The present invention provides a method for performing a skinning operation in a much more controlled cutting process that significantly reduces the chance of cutting below the loin fat and into the muscle, which often happens when the loin is pulled using conventional separation practices and tools. In particular, the skinning operation of the present invention utilizes one or more ultrasonic sensors and a progressive charge coupled device gray scale camera, which together define a map of the fat/muscle surface area. Once the map is determined, an algorithm is used to determine where the skinner blade should be adjusted to perform the optimum cut. Upon determination of where to cut, a signal is sent to the proper skinner positioning screw motors via a signal transmitting means (such as an RS232 cable, fiber optic cable or other suitable means) in order to set necessary adjustments. The above sensing, map determining and signal processing is preferably performed under 5 seconds, and more preferably in less than 2 seconds.

Utilization of the present invention can significantly reduce the number of works per shift on a pork processing line and the dimensional area of the cut floor area can be reduced by 25% to 50%. In the automated process, ultrasound can be used to generate a pulse, preferably in a single sine cycle excitation (rather than a step pulse due to reduced ringing in the sensor), such pulse digitized at radio frequency (about 40 MHz) to obtain maximum resolution in time. A 2–5 MHz transducer is preferred. The sensor is preferably flat and has good acoustical coupling and good wear resistance as well as a fracture proofing enclosure. The sensor utilized is loaded with low impedance to obtain the best possible impulse response. By maintaining a good impulse response, it is possible to detect muscle depth during the loin pulling operation. Alternatively, separate sensors can be used to measure the muscle depth profile, thus yielding a very accurate prediction of loin eye size, area and shape.

A first unit is utilized to cut the scribe and separate the belly from the loin. The loin ribs are forced against a fixed guide and a circular saw is used to cut a consistent scribe. The saw blade is guided by a foot to obtain a known cutting depth. The saw blade can therefore be lifted to avoid cutting after the ribs have passed. Following immediately after the saw blade and mounted on the same foot, is a Z-shaped knife (one embodiment of the present knife apparatus of the present invention) that separates the loin from the belly and leaves approximately 2–3 inches of fatback on the belly. The Z-knife of the present invention is configured to cut extremely close to the ribs to leave lean fingers of meat on the belly portion. Rib curvatures and length profiles can be loaded into a computer to further optimize the automated process.

A second unit of the present invention involves a skinner that is able to skin the loin portion immediately after a pulling knife of the present invention is drawn through the animal carcass. A curved drum may be utilized to pull the skin consistently. In one particular embodiment, a sensor to measure the thickness of the fat cover is associated with the knife and such measurement is used to position the knife so a constant, known fat cover is obtained. A servo loop is provided to allow for a closed-loop control.

A production machine includes a computer, with user interface and motor drive, VFD and power stops. A servo motor transmission system, chain load springs and a chain motor are operatively associated. A chain, knife and belt section are further operatively associated with the servo motor and transmission system. A loin entry sensor can be located between chains using reflection from a belt on a belt drive motor.

In determining the initial depth setting to which a knife entry point may be set, the present invention uses primal vision on the shoulder cut to predict the compressed fat profile at the entry surface. Such predictions are believed to be fairly precise. An alternative approach is to measure the actual compressed fat profile or the depth of fat in one point immediately prior to knife entry. The dedicated sensor can be used for this purpose that uses either ultrasound or a vision system that views the compressed surface. Mechanical guidance in compression systems can be of conventional design (e.g., the LeBlanc loin puller). A knife fixture and positioning system is provided, preferably with a step motor and a simple switching mechanism. A pulse-echo interface is utilized as well as a manual up/down function for sensor-out situations.

Other aspects of the present invention will be made clear through a reading of the Detailed Description.

DETAILED DESCRIPTION

Figure 4:
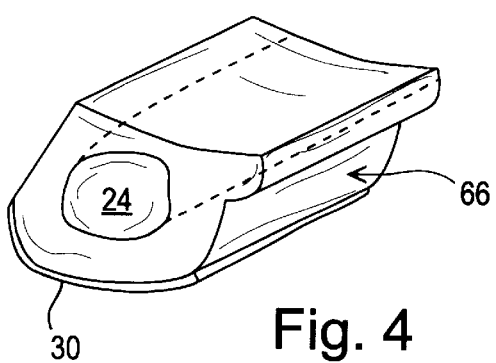
FIG. 4 is a side perspective view of a pork loin after cutting operation of the present invention.
Figure 5:
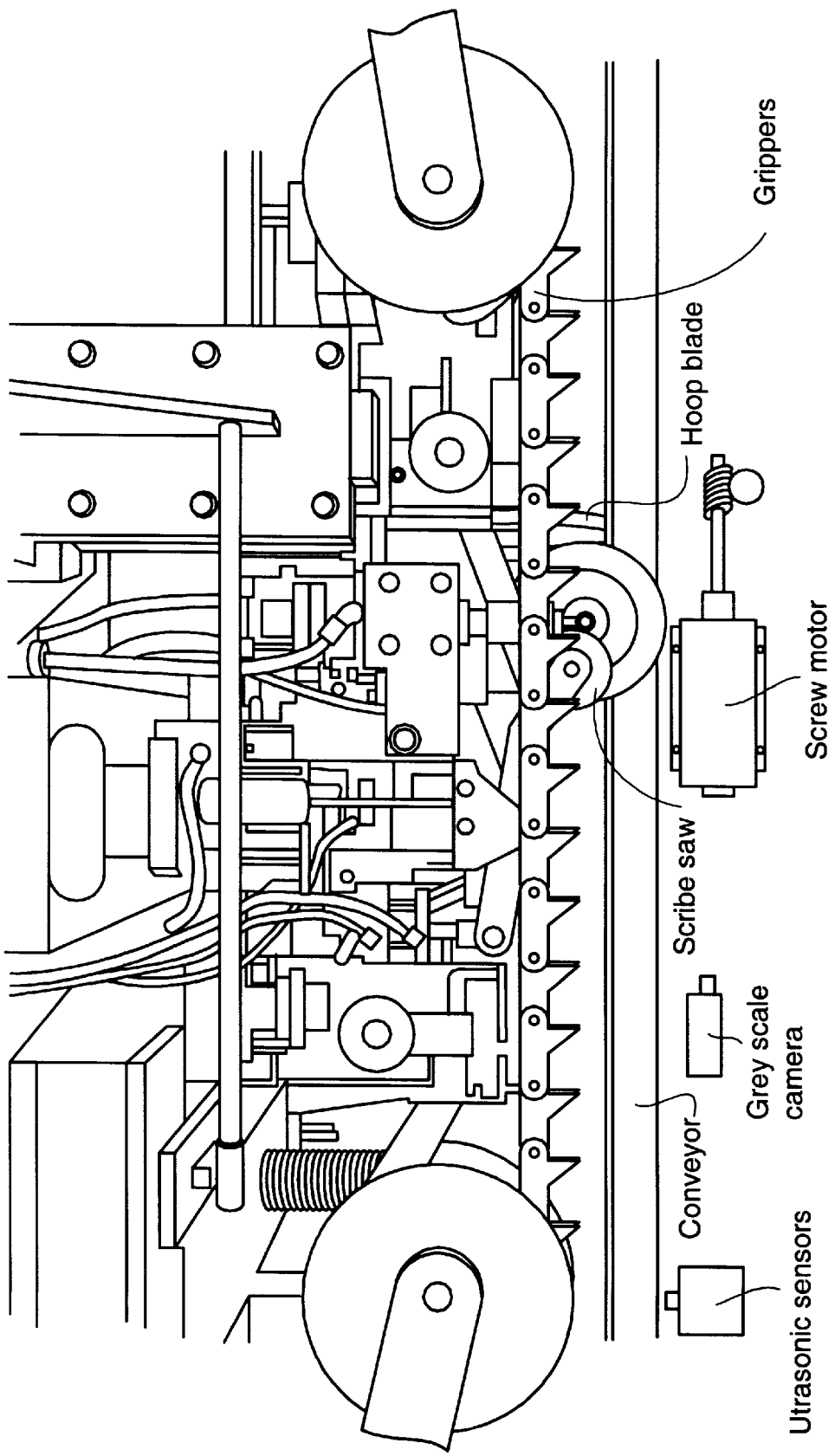
FIG. 5 is a side perspective view of the automated system for processing a hog carcas.
Figure 6:
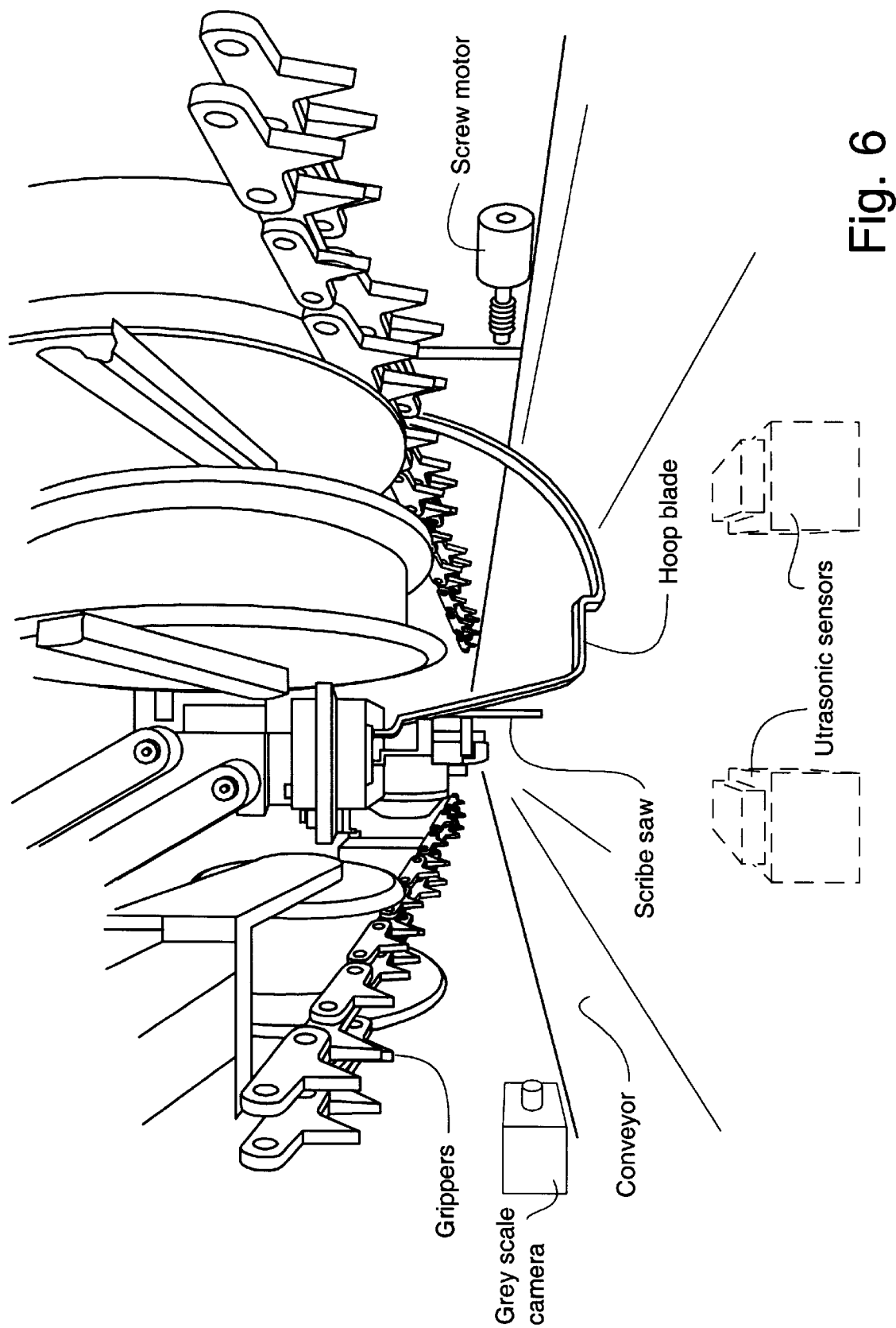
FIG. 6 is a perspective view of the present invention as viewed from the conveyor belt upon which carcasses are transported.

The novel knife of the present invention is used as a replacement for the conventional loin pulling knife 36 described in the background above. However, note that the contour or profile of the blade 54 is substantially different from the contour of the blade 40 of the typical loin pulling knife 36. In particular, instead of the length of the blade between the handles 44a and 44b being smoothly concave (from the loin puller's perspective), the blade 54 has an inwardly projecting bend 58 that juts in toward the pork loin 24. Additionally, note that the blade 54 exits the loin and belly portion 20 at a site 62 substantially adjacent to the inwardly projecting bend 58. Further, note that the site 62 is on the skin 30 side of the loin and belly portion 20 as opposed to the cut pork loin end 66. Thus, it is highly improbable that when pulling the loin pulling knife 50 through the length of the loin and belly portion 20, that the pork loin 24 will be cut. Further, it is also highly unlikely that an excessive amount of fat between the pork loin and the loin pulling cut 66 (FIG. 4) is retained about the pork loin 24 since the pulling operation tends to force the blade 54 into contact with the skin 30 so that the portion of the blade between the site 62 and the handle 44a remains in contact with the skin 30 and thereby makes it difficult to skew the loin pulling cut 66 sufficiently to come near to the pork loin 24. Further note that since a reduced portion of the blade 54 is used in separating the pork loin 24 from the belly portion 26, the blade need only be sharp in a restricted area containing the inwardly projecting bend 58, instead of substantially the entire blade as is the case with the prior art loin pulling knife 36. Moreover, since the loin pulling knife 50 cuts through a substantially smaller cross section of the loin and belly portion 20 than the prior art loin pulling knife 36, the loin pulling knife 50 may require less effort to pull the length L of the loin and belly portion 20. Accordingly, since the manual job of loin pulling is exceedingly strenuous, loin pulling produces more back injuries than other meat processing occupations. Therefore, such reduction in the amount of exertion necessary is also extremely advantageous for reducing workman's compensation related to back injuries.

Figure 1:
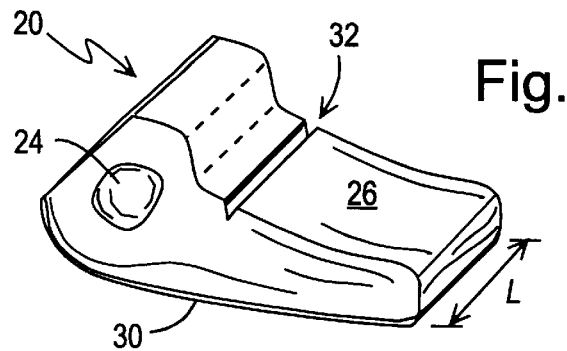
In FIG. 1, a pork loan and belly section is shown as is typically sectioned from a hog carcass.
Figure 2:
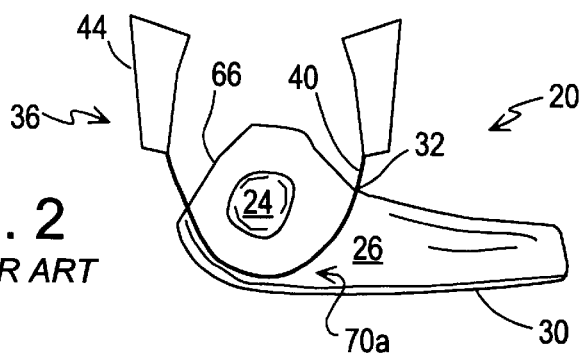
FIG. 2 illustrates a prior art pork loin pulling knife in cross section.
Figure 3:
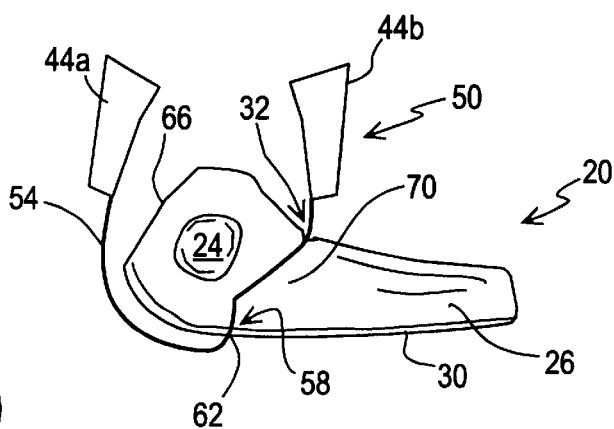
FIG. 3 shows a profile view of a novel loin pulling knife 50 of the present invention.

Additionally, note that the inwardly projecting bend 58 provides a well defined thickness of the belly portion 26 known as the "fat back" that is generally in the area of the label 70. The substantially well-defined thickness of the fat back 70 provided by the loin pulling knife of the present invention may be contrasted to the substantially less uniform thickness of fat back 70a (FIG. 2) that remains with the belly portion 26 upon separation from the pork loin 24. Thus, since this more appropriately shaped fat back portion 70 as shown in FIG. 3 is better able to be processed as a saleable commodity, further cost savings are provided by the contour of the cut made by the loin pulling knife 50 of the present invention.

While various embodiments of the present invention have been described in detail, it is apparent that further modifications and adaptations of the invention will occur to those skilled in the art. However, it is to be expressly understood that such modifications and adaptations are within the spirit and scope of the present invention.

What is claimed is:

1. An automated system for processing a hog carcass, said carcass having a loin portion, a belly portion, a rib section and a first and second side, comprising:

a first cutting blade configured so as to fit through a cut previously made in a rib section of the hog carcass such that said blade proceeds along said cut throughout a cutting operation;

a second cutting blade positioned on a second side of said animal carcass portion being severed, said blade being positioned so that a significant portion of skin associated with said belly portion of said carcass is retained on said belly portion after said cutting operation;

a driving means operatively associated with said first and second cutting blades, said driving means capable of moving the first and second blades in a predetermined fashion to sever said loin portion from said belly portion;

at least one ultrasonic sensor operatively associated with a progressive charge coupled camera capable of defining a map of a fat/muscle surface area of said hog carcass;

one or more skinner positioning screw motors in communication with said first and second cutting blades and with at least one of said ultrasonic sensors such that when a signal from one of said ultrasonic sensors is received by said one or more skinner positioning screw motors, said first and second cutting blades are guided into proper positioning for a cutting operation;

whereby said cutting operation maximizes the amount of skin remaining with the belly portion of the hog carcass after severing of said loin portion and said belly portion.

2. The system as set forth in claim 1, wherein said cutting operation results in a severed loin portion that has no more than approximately ½ inch of fat surrounding said loin portion and where said cutting operation is performed without the trimming of skin from said loin portion.

3. The system as set forth in claim 1, wherein said cutting operation is performed prior to a skin trimming operation, thus achieving avoidance of excessive loin meat removal.

4. The device as set forth in claim 1, wherein said at least one of said ultrasonic sensors detects a muscle depth of said carcass.

5. The device as set forth in claim 1, wherein said at least one of said ultrasonic sensors is used to measure a muscle depth profile to determine a prediction of loin eye size, area and shape.

6. The device as set forth in claim 1, wherein said at least one of said ultrasonic sensors is capable of perceiving both the position of said first and second blades and the position of said loin portion.

7. An automated method for processing a hog carcass, said carcass having a loin portion, a belly portion, a rib section and a first and second side, comprising:

providing a first cutting blade configured so as to fit through a cut previously made in a rib section of the hog carcass such that said blade proceeds along said cut throughout a cutting operation;

positioning a second cutting blade on a second side of said animal carcass portion being severed, said blade being positioned so that a significant portion of skin associated with said belly portion of said carcass is retained on said belly portion after said cutting operation;

moving a driving means, operatively associated with said first and second cutting blades, in a predetermined fashion to sever said loin portion from said belly portion;

defining a map of a fat/muscle surface area of said hog carcass using at least one ultrasonic sensor operatively associated with a progressive charge coupled camera;

guiding said first and second cutting blades into proper positioning for a cutting operation using one or more skinner positioning screw motors in communication with said first and second cutting blades and with at least one of said ultrasonic sensors;

whereby said method maximizes the amount of skin remaining with the belly portion of the hog carcass after severing of said loin portion and said belly portion.

8. The method as set forth in claim 7, wherein said communication of a signal between at least one of said ultrasonic sensors and said positioning screw motors is transmitted over a cable selected from the group consisting of an RS 232 cable and a fiber optic cable.

9. The method as set forth in claim 7, wherein said step of defining a map of a fat/muscle surface is performed in less than 5 seconds.

10. The method as set forth in claim 7, wherein said ultrasound sensor produces a single sine cycle excitation pulse digitized at a radio frequency of about 40 mg.

11. The system as set forth in claim 1, wherein said at least one ultrasonic sensor is flat, has good acoustical coupling and wear resistance, and has a fracture proofing enclosure.

12. The system as set forth in claim 1, wherein one of said first and second cutting blades has a Z-shape.

* * * * *